(12) United States Patent
Lee et al.

(10) Patent No.: US 7,369,771 B2
(45) Date of Patent: May 6, 2008

(54) OPTICAL NETWORK TERMINATOR AND OPTICAL NETWORK CONNECTION METHOD USING IT

(75) Inventors: Chang Hee Lee, Daejeon (KR); Kwang Pyo Hong, Seoul (KR); Jin Serk Baik, Ansan-si (KR); Sung Man Kim, Gumi-si (KR); Sang Mook Lee, Gimcheon-si (KR); Sil Gu Mun, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 102 days.

(21) Appl. No.: 11/388,228

(22) Filed: Mar. 23, 2006

(65) Prior Publication Data

US 2006/0257147 A1 Nov. 16, 2006

Related U.S. Application Data

(63) Continuation of application No. PCT/KR2004/002449, filed on Sep. 23, 2004.

(30) Foreign Application Priority Data

Sep. 23, 2003 (KR) .................. 10-2003-0065956

(51) Int. Cl.
*H04J 14/00* (2006.01)
(52) U.S. Cl. ............... 398/72; 398/66; 398/67; 398/68; 398/69; 398/70; 398/71; 398/79; 398/75; 398/76; 398/77; 398/78; 398/82; 398/182; 398/183; 398/192; 398/193; 398/196; 398/197; 398/135; 398/136; 398/137; 398/163; 398/33; 398/38; 398/98; 398/99; 398/100
(58) Field of Classification Search ............. 398/66, 398/67, 68, 69, 70, 71, 72, 75, 76, 77, 78, 398/79, 91, 136, 94, 98, 137, 99, 100, 135, 398/182, 183, 192, 193, 197, 163, 33, 38, 398/82
See application file for complete search history.

(56) References Cited

U.S. PATENT DOCUMENTS

| 6,411,410 B1* | 6/2002 | Wright et al. .................. 398/79 |
| 6,525,858 B1 | 2/2003 | Nagahori |
| 2001/0004290 A1* | 6/2001 | Lee et al. .................... 359/124 |
| 2002/0063924 A1* | 5/2002 | Kimbrough et al. ........ 359/125 |

FOREIGN PATENT DOCUMENTS

| DE | 4203855 | 8/1993 |
| EP | 1 133 084 A1 | 9/2001 |

OTHER PUBLICATIONS

Search Report, PCT/KR2004/002449 (WO2005/029733A1), Published Mar. 31, 2005, filed Sept. 23, 2004, Korea Advanced Institute of Science and Technology.

* cited by examiner

*Primary Examiner*—Hanh Phan
(74) *Attorney, Agent, or Firm*—Graybeal, Jackson, Haley, LLP

(57) ABSTRACT

An optical network terminator of the present invention includes an optical wavelength division multiplexer for receiving an optical signal and incoherent light. An optical detection unit converts a downstream high speed and low speed optical signals into electrical signals. A laser diode converts an upstream signal into an optical signal. A high speed driving unit is supplied with power from a power supply unit to drive a forward-biased laser diode and establish a data and video channel. A high speed reception unit is supplied with the power to receive a downstream data and video channel. A charging unit outputs charged power at the time of a power failure. A low speed driving unit is supplied with the charged power to reverse-bias the laser diode to establish a voice channel. A low speed reception unit is supplied with the charged power to receive a voice channel.

20 Claims, 5 Drawing Sheets

OPTICAL NETWORK TERMINATOR AND OPTICAL NETWORK CONNECTION METHOD USING IT

CROSS-REFERENCE TO RELATED APPLICATION

This is a continuation application that claims benefit, under 35 USC §120, of International Application PCT/KR20043/002449, filed 23 Sep. 2004, designating the United States, which claims foreign priority benefits under 35 USC §119(a) to Korean Patent Application No. 10-2003-0065956 filed 23 Sep. 2003 both of which are incorporated herein by reference.

TECHNICAL FIELD

The present invention relates, in general, to optical network terminators and, more particularly, to an optical network terminator and optical network connection method using the same, which is used for fiber-to-the-home that allows an optical fiber to be deployed to the home of a subscriber to provide voice, data and video.

BACKGROUND ART

A Wavelength Division Multiple Access Passive Optical Network (WDMA PON) is super high speed Internet transmission technology capable of replacing a current Very-High-Data-Rate Digital Subscriber Line (VDSL). If this WDMA PON is applied to a typical optical network, voice, data and video can be simultaneously used in real time for online games, super high speed Internet access, etc., in addition to voice and High Definition Television (HDTV) and various digital video services. In order to apply such a WDMA PON to a typical optical network, Fiber-To-The-Home (FTTH), allowing an optical fiber to be deployed to the home of a subscriber, must be realized.

In a WDMA PON using a conventional fixed-wavelength fabry-perot laser diode, a fabry-perot laser diode is deployed in an optical network terminator, and a Central Office (CO) injects incoherent light into the laser diode, so that the oscillation wavelength of the fabry-perot laser is fixed at the wavelength of the injected incoherent light. At this time, if the fabry-perot laser diode acts as a light modulator having a gain, a bias current approaches an oscillation threshold current. Therefore, a considerable amount of power is consumed by the fabry-perot laser diode. However, if a situation where power is not supplied to an optical network terminator, that is, a power failure situation, occurs, it is impossible to drive the fabry-perot laser diode, so that a situation where a subscriber cannot communicate may occur.

This situation is a great interruption when a current wired telephone line has been replaced. In the case of the current wired telephone line, since the central office supplies power through the telephone line, communication is possible even in a power failure situation. However, in the case of FTTH transmission technology including WDMA PON, when power is not supplied, as in a power failure, a communication channel cannot be provided. Therefore, a subscriber cannot communicate with others when an emergency situation occurs.

Generally, if a current above an oscillation threshold current is applied to a fabry-perot laser, there are multiple oscillation modes output. However, if incoherent light, in which a narrow band wavelength is filtered, is injected from the central office, the modes at the wavelengths differing from the wavelength of the injected light among the multiple oscillation modes are suppressed, and the only an oscillation mode having the wavelength identical to that of the light injected remains in the output. That is, only the oscillation mode having a wavelength identical to that of the injected light remains, thus enabling the fabry-perot laser diode having the miltiple oscillation modes to be operated as in a single mode. These are the principles of the WDMA PON using a fixed-wavelength fabry-perot laser. In this case, an incoherent light source is placed in a central office. Since the central office is not affected by a power failure, incoherent light is always injected into an optical network terminator from the central office. Therefore, if this incoherent light can be modulated and the modulated light can be returned to the central office, communication is possible even in a power failure.

The modulation of incoherent light injected at low power can be performed by applying a forward bias current below a threshold current or applying a reverse bias current to a fabry-perot laser. If the fabry-perot laser is modulated at a current below an oscillation threshold current, total light output power is reduced compared to the case where a current above a threshold current is applied, but a modulated optical signal with intensity sufficient to transmit a low speed signal, the speed of which is an integer times 64 kbps, such as a voice signal, can be generated. Therefore, since a current below a threshold current is applied, power consumption can greatly decrease compared to the case where a fabry-perot laser is driven using a current above a steady state threshold current. Therefore, a communication channel can be established for a considerable period of time using a small capacity battery at the time of a power failure. Further, in the case of a forward bias, the output power of a laser diode varies even when incoherent light is not externally injected, so that a fabry-perot laser diode can be operated by utilizing the forward bias characteristics even in a construction in which an incoherent light source does not exist.

In the meantime, if a reverse bias voltage is applied to a fabry-perot laser diode, the fabry-perot laser diode acts as an electro-absorption modulator that absorbs externally injected light, instead of acting as an amplifier that increases optical power. That is, the reverse-biased fabry-perot laser diode absorbs part of the incident light, and the remaining part thereof is output after reflected by a mirror. At this time, since absorptivity varies with an applied reverse bias voltage, the voltage is adjusted to convert an electrical signal into an optical signal. In this case, the front facet of the fabry-perot laser diode needs to be anti-reflection coated so as to perform efficient modulation. Such anti-reflection coating on the fabry-perot laser diode is adapted to reduce the extent of wideband light reflected from an incident side of the fabry-perot laser diode. That is, if a fabry-perot laser diode that is not coated is used, the amount of light reflected from the incident facet is greater than the amount of light obtained after being absorbed by the fabry-perot laser diode. Then, a central office has difficulty in distinguishing such modulated signals from the reflected incoherent light. Because a reverse current of a laser diode is much lower than a forward current, power consumption of the laser diode operated in this way can be greatly reduced compared to the case where the laser diode is operated in forward bias. Furthermore, in order to increase modulation efficiency, the incident side of the fabry-perot laser diode may be anti-reflection coated and/or an opposite surface may be high-reflection coated.

DISCLOSURE

Technical Problem

Figure 1:
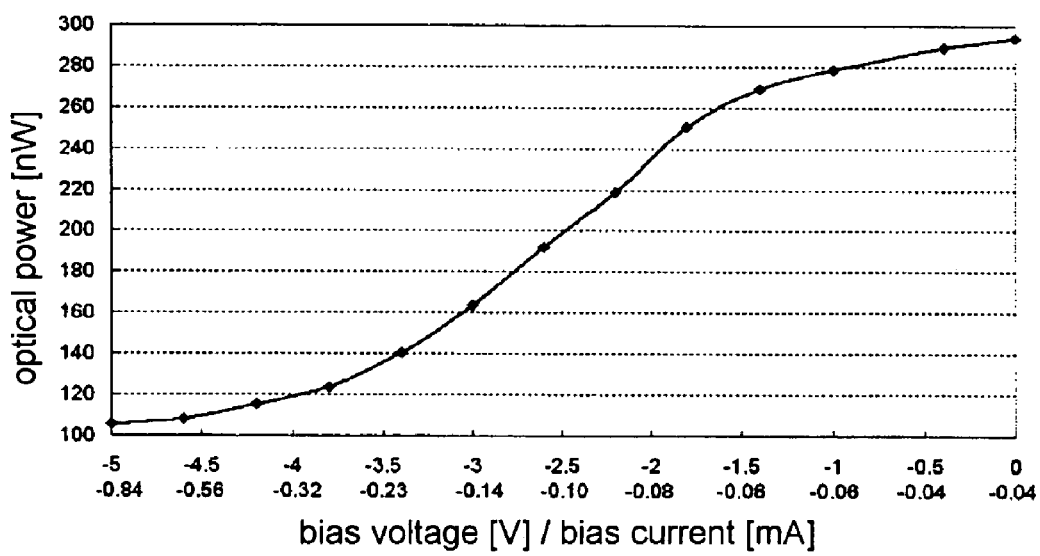
FIG. 1 is a graph showing optical output power versus voltage and current of a fabry-perot laser diode into which incoherent light is injected.

Accordingly, the present invention has been made keeping in mind the above problems occurring in the prior art, and an object of the present invention is to provide an optical network terminator and optical network connection method, which allows voice communication to continue using incoherent light injected from a central office through the use of a small-sized power supply even in a power failure situation.

Technical Solution

In order to accomplish the above object, the present invention provides an optical network terminator which is equipped with a power supply unit and adapted to be connected to a central office through an optical fiber. The optical network terminator comprises an optical wavelength division multiplexer for receiving a reception optical signal and incoherent light provided from the central office, and individually outputting the reception optical signal and the incoherent light. The optical network terminator also comprises an optical detection unit for converting both a downstream high speed optical signal and a downstream low speed optical signal corresponding to the reception optical signal provided from the optical wavelength division multiplexer into electrical signals, respectively. The optical network terminator also comprises a laser diode connected to the optical wavelength division multiplexer to convert an upstream signal into an optical signal. The optical network terminator also comprises a high speed driving unit supplied with power from the power supply unit. The high speed driving unit drives the laser diode that is forward biased using the upstream signal to establish a data and video channel for the purpose of transmitting data and video signal to the central office through the optical wavelength division multiplexer. The optical network terminator also comprises a high speed reception unit supplied with power from the power supply unit to receive a downstream data and video channel from the optical detection unit. The optical network terminator also comprises a charging unit charged with the power supplied from the power supply unit in a steady state. The charging unit outputs charged power at the time of a power failure. The optical network terminator also comprises a low speed driving unit supplied with power from the charging unit. The low speed driving unit biases the laser diode reversely to establish a voice channel for the purpose of transmitting voice signal to the central office through the optical wavelength division multiplexer. The optical network terminator also comprises a low speed reception unit supplied with the power from the charging unit to receive a voice channel from the optical detection unit.

Advantageous Effects

The present invention allows a voice service to continue for a considerable period of time using low power when the supply of power to an optical network terminator is stopped due to a power failure in a Wavelength Division Multiple Access Passive Optical Network (WDMA PON) using a wavelength-locked low cost fabry-perot laser diode. That is, at the time of a power failure, the amount of current flowing through the fabry-perot laser diode is minimized, and power is supplied only to a low speed optical transceiver that exchanges only voice signals, thus minimizing power consumption. In particular, if the fabry-perot laser diode is modulated in forward bias below a threshold current, or modulated in reverse bias, power consumption is minimized, thus extending a communication period.

Best Mode

Hereinafter, embodiments of the present invention will be described in detail with reference to the attached drawings.

FIG. 1 shows a curve of optical output power versus voltage and current of a fabry-perot laser diode into which incoherent light is injected. It can be seen that, as a reverse bias voltage induced at the fabry-perot laser diode increases, optical output power gradually decreases. Since a reverse-biased fabry-perot laser diode absorbs a large amount of light as the reverse bias voltage applied to the fabry-perot laser diode increases, optical output power decreases as a reverse current increases. Therefore, the fabry-perot laser diode is characterized in that, if laser is modulated using a bias voltage, an optical signal is generated to enable communication.

Using the above characteristics, the optical network terminator of the present invention can establish a communication channel at the time of a power failure.

Figure 2:
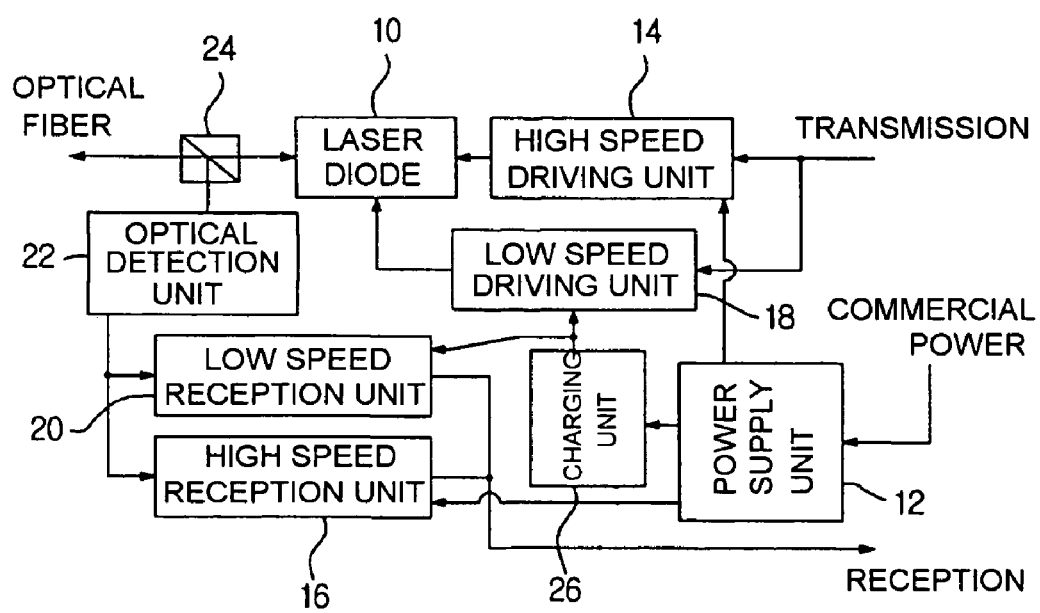
FIG. 2 is a block diagram of an optical network terminator according to an embodiment of the present invention.

FIG. 2 is a block diagram of an optical network terminator according to an embodiment of the present invention. The optical network terminator is adapted to be connected to a central office by a strand of optical fiber. The optical network terminator includes a laser diode 10, a power supply unit 12, a high speed driving unit 14, a high speed reception unit 16, a low speed driving unit 18, a low speed reception unit 20, an optical detection unit 22, an optical wavelength division multiplexer 24 and a charging unit 26.

In FIG. 2, the high speed driving unit 14 supplied with power from the power supply unit 12 forward-biases the laser diode 10 to perform modulation. The high speed driving unit 14 establishes a data and video channel for the purpose of transmitting data and video signal to the central office through the optical wavelength division multiplexer 24. A typical laser diode, as well as a fabry-perot laser diode, can be used as the laser diode 10. The power supply unit 12 is supplied with commercial power and transforms the commercial power into specific power suitable for the apparatus of the present invention.

The high speed reception unit 16 supplied with power from the power supply unit 12 receives a downstream data and video channel from the optical detection unit 22.

The charging unit 26 charged with power supplied from the power supply unit 12 in a steady state provides the charged power to both the low speed driving unit 18 and the low speed reception unit 20 at the time of a power failure. For example, at the time of a power failure, both the high speed driving unit 14 and the high speed reception unit 16 that are directly connected to the power supply unit 12 stop their operation, while both the low speed driving unit 18 and the low speed reception unit 20 that are connected to the charging unit 26 continue to operate until the power charged in the charging unit 26 is discharged completely. Since the charge capacity of the charging unit 26 is limited, a channel maintenance period can lengthen as power consumed to establish a voice channel decreases. In the meantime, in such a construction, the charging unit 26 should always be charged. In order to solve this problem, if commercial power is interrupted due to a power failure, etc. while the power supply unit 12 is disconnected from the charging unit 26 and supplies the low speed driving unit 18 and the low speed reception unit 20 with power in a steady state, the charging unit 26 supplies the low speed driving unit 18 and the low speed reception unit 20 with power through a predetermined switching operation.

The low speed driving unit 18 supplied with power from the charging unit 26 reverse-biases the laser diode 10 to perform modulation. The low speed driving unit 18 establishes a voice channel for the purpose of transmitting voice signal to the central office through the optical wavelength division multiplexer.

The low speed reception unit 20 supplied with power from the charging unit 26 receives and demodulates the voice channel provided from the optical detection unit 22.

The optical detection unit 22 converts optical input provided from the optical wavelength division multiplexer 24 into an electrical signal to provide the electrical signal both to the high speed reception unit 16 and to the low speed reception unit 20.

The optical wavelength division multiplexer 24 receives incoherent light and a downstream optical signal provided from the central office. Then, the optical wavelength division multiplexer 24 provides the downstream optical signal to the optical detection unit 22 and the incoherent light to the laser diode 10.

Figure 3:
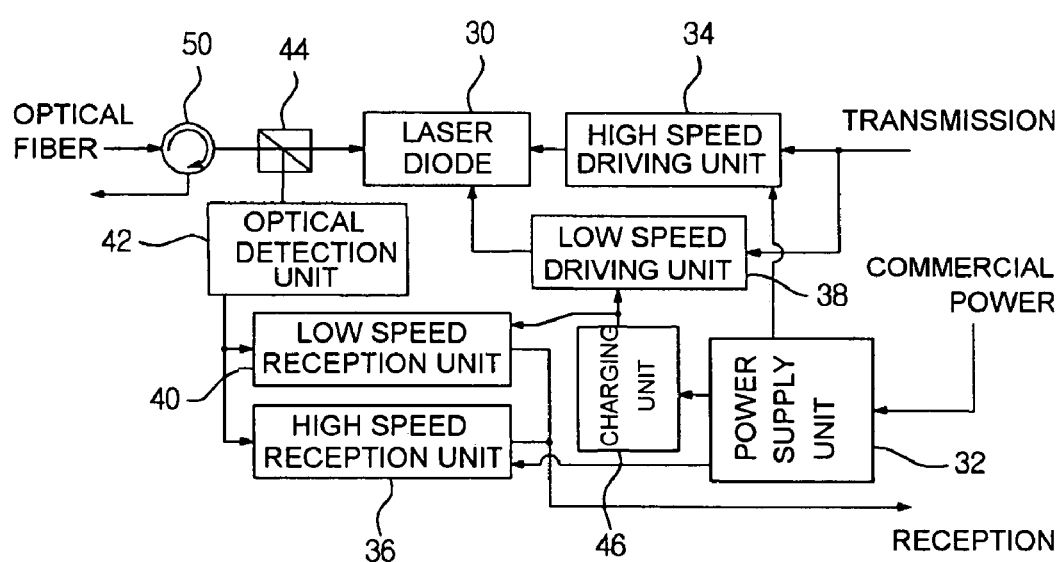
FIG. 3 is a block diagram of an optical network terminator according to another embodiment of the present invention.

FIG. 3 shows a block diagram of an optical network terminator according to another embodiment of the present invention. The optical network terminator adapted to be connected to a central office by two strands of optical fiber includes a laser diode 30, a power supply unit 32, a high speed driving unit 34, a high speed reception unit 36, a low speed driving unit 38, a low speed reception unit 40, an optical detection unit 42, an optical wavelength division multiplexer 44, a charging unit 46 and an optical circulator 50.

Since, the operations of the laser diode 30, the power supply unit 32, the high speed driving unit 34, the high speed reception unit 36, the low speed driving unit 38, the low speed reception unit 40, the optical detection unit 42, the optical wavelength division multiplexer 44 and the charging unit 46 are identical to those of the laser diode 10, the power supply unit 12, the high speed driving unit 14, the high speed reception unit 16, the low speed driving unit 18, the low speed reception unit 20, the optical detection unit 22, the optical wavelength division multiplexer 24 and the charging unit 26 shown in FIG. 2, respectively, detailed descriptions thereof are abbreviated. In the embodiment of FIG. 2, the optical wavelength division multiplexer 24 is adapted to be connected to the central office by a strand of optical fiber. In contrast, in the embodiment of FIG. 3, the optical wavelength division multiplexer 44 is adapted to be connected to the central office through two strands of optical fiber via the optical circulator 50. One of the two strands of optical fiber is used to directly supply incoherent light to the optical network and transmit downstream data, and the other thereof is used to transmit upstream data.

In the above-described present invention, a pilot tone method and a Sub-Carrier Multiple Access (SCMA) method can be used to simultaneously establish both a data and video channel and a voice channel using a limited bandwidth. If the two channels use the same bandwidth, a voice channel is established using a low level pilot tone in a data and video channel band. On the contrary, if the two channels may use different bandwidths, a voice channel band is separately implemented on a sub-carrier using the SCMA method.

In a WDMA PON structure using a fixed-wavelength fabry-perot laser diode that was proposed in the prior art, signal quality is deteriorated due to a Rayleigh inverse scattering phenomenon in the case where a central office injects incoherent light into a subscriber using a strand of optical fiber and then an optical network terminator modulates the incoherent light and transmits the modulated light to the central office, as described above. That is, the incoherent light injected by the central office is injected back into the central office due to inverse scattering, and the injected light interferes with a signal transmitted from the optical network terminator to the central office.

In order to prevent this phenomenon, it is preferable to separate an optical fiber used to provide incoherent light from the central office to a subscriber and an optical fiber used to provide a signal from the subscriber to the central office.

In FIG. 2, the optical network terminator is adapted connected to the central office through an optical fiber and an Arrayed Waveguide Grating (AWG) in the case of Wavelength Division Multiple Access (WDMA), and by an optical fiber and a beam splitter in the case of Time Division Multiple Access (TDMA), respectively.

In FIG. 3, the incoherent light, injected by the central office, and a downstream signal are transferred through an upper optical fiber, and an upstream signal is transferred through a lower optical fiber.

Figure 4:
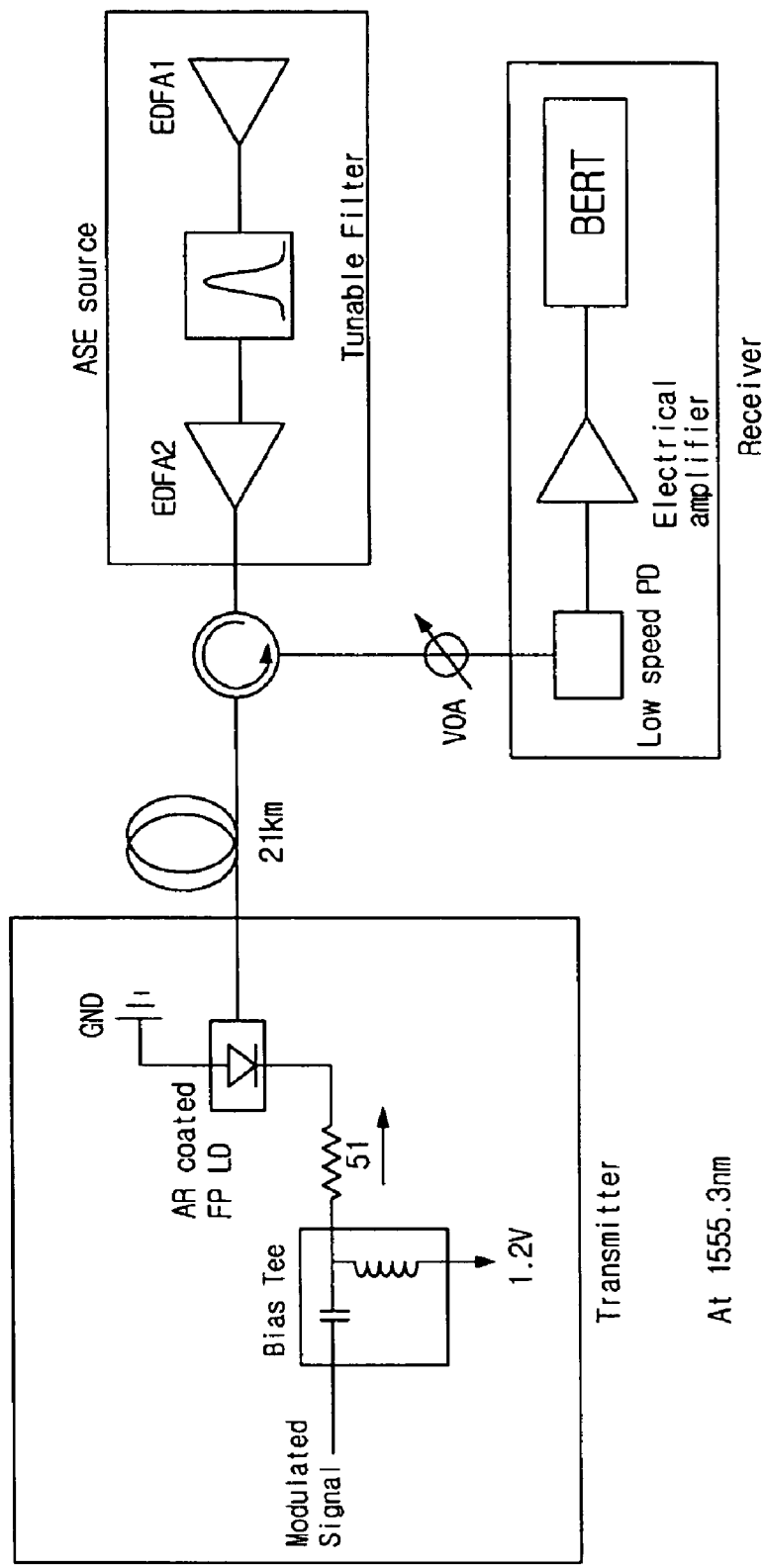
FIG. 4 is a view showing an experiment on communication channels using a reverse-biased fabry-perot laser diode.

FIG. 4 is a view showing an experiment on communication channels using a reverse-biased fabry-perot laser diode. For the experiment, a transmission stage is constructed so that an anti-reflection coated fabry-perot laser diode is operated in reverse bias using supplied power, a bias tee for establishing a reverse bias operating point of the fabry-perot laser diode is installed, and a bias voltage is changed using a signal externally applied through the bias tee. Further, an Amplified Spontaneous Emission (ASE) source is placed at a location that corresponds to the central office and is spaced apart from the optical transmission stage by about 21 Km, and the optical transmission stage and the ASE source are connected to each other using a strand of optical fiber. Further, in order to determine which modulation waveform is output by the optical signal modulated by the fabry-perot laser diode that is reverse biased and acts as an electro-absorption modulator, an optical circulator is connected to the input stage of the ASE source, and a photodetector capable of converting an optical signal into an electrical signal is connected to the output stage of the optical circulator. Since the output of the photodetector is an electrical signal, the electrical signal can be measured using an oscilloscope, a Bit Error Rate Tester (BERT), etc. In the experiment, incoherent light injected into the ASE source using a variable optical filter was fixed at a desired wavelength.

Figure 5:
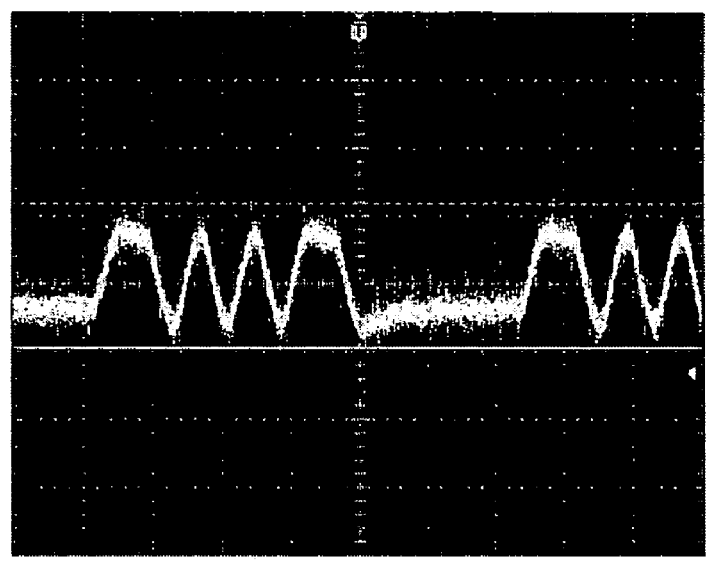
FIG. 5 is a view showing an optical output power waveform of the reverse-biased fabry-perot laser diode measured in the experiment of FIG. 4.
Figure 6:
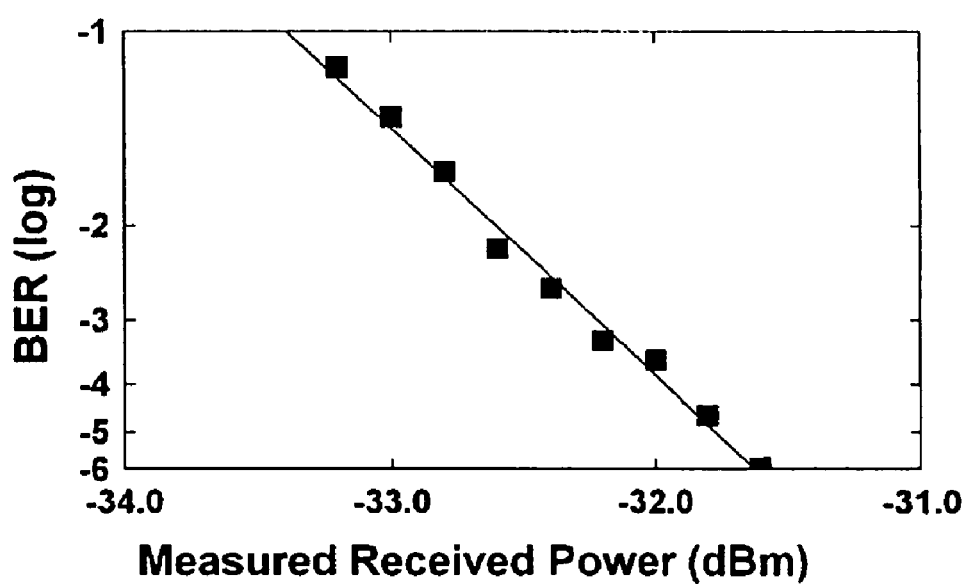
FIG. 6 is a graph showing bit error rate versus optical output power of the reverse-biased fabry-perot laser diode measured in the experiment of FIG. 4.
Figure 7:
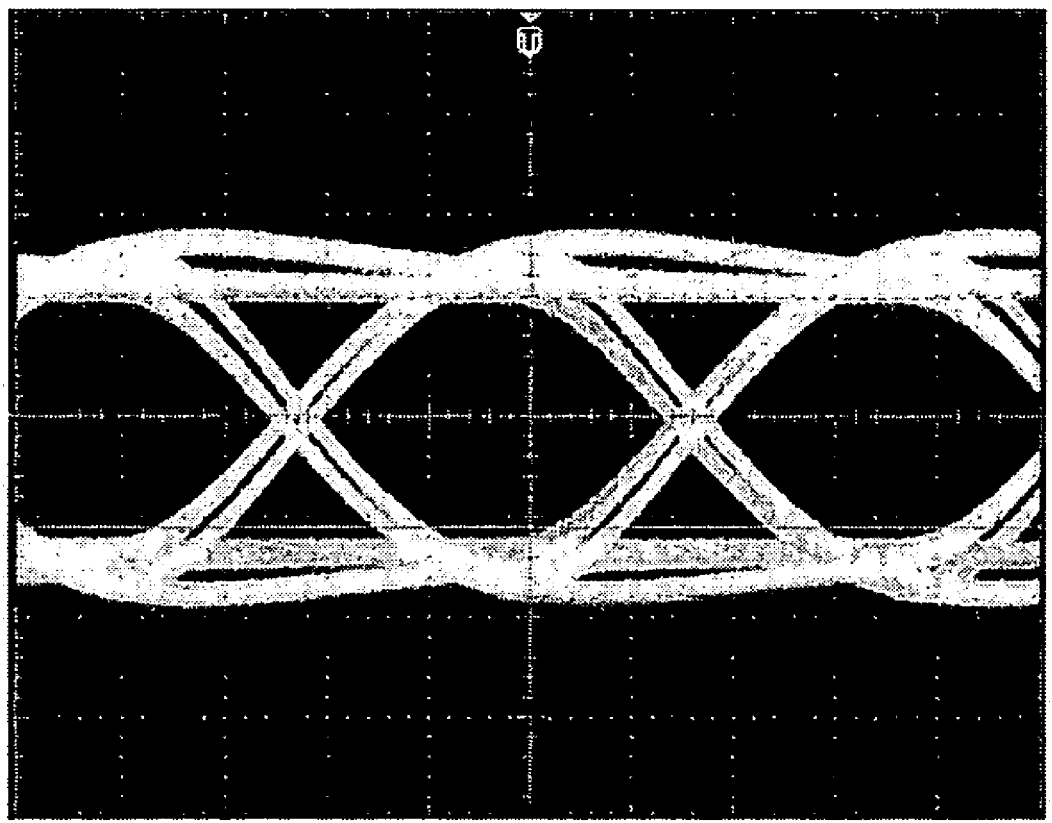
FIG. 7 is a view showing an eye-diagram of the optical output power of the reverse-biased fabry-perot laser diode measured in the experiment of FIG. 4.

The reverse bias voltage of the fabry-perot laser diode was maintained at −1V, a modulation index was set to 1, and the amplified spontaneous emission, which is input from the ASE source to the fabry-perot laser diode, was set to have a level of −16 dBm at a wavelength of 1555.3 nm. Further, the results of FIGS. 5 and 7 were obtained using an oscilloscope at a measurement stage, and the results of FIG. 6 were obtained using a bit error rate tester. Referring to FIG. 5, the optical modulation power of the reverse-biased fabry-perot laser diode has a level sufficient to perform basic voice communication at 64 kbps. The total power consumed by a driving unit is about 1.5 mW, which is a significantly low value in consideration of the fact that when the laser diode is forward-biased in a steady state exists, power consumed by the driving unit is between 30 mW and 100 mW. Further, referring to FIGS. 6 and 7, it can be seen that a voice channel can be established using an optical signal modulated by the reverse-biased fabry-perot laser diode.

The invention claimed is:

1. An optical network terminator equipped with a power supply unit and adapted to be connected to a central office through an optical fiber, comprising:
   an optical wavelength division multiplexer for receiving a reception optical signal and incoherent light provided from the central office, and individually outputting the reception optical signal and the incoherent light;
   an optical detection unit for converting both a downstream high speed optical signal and a downstream low speed optical signal corresponding to the reception optical signal provided from the optical wavelength division multiplexer into electrical signals, respectively;
   a laser diode connected to the optical wavelength division multiplexer to convert an upstream signal into an optical signal;
   a high speed driving unit supplied with power from the power supply unit to drive the laser diode that is forward biased using the upstream signal and to establish a data and video channel for the purpose of transmitting data and video signal to the central office through the optical wavelength division multiplexer;
   a high speed reception unit supplied with power from the power supply unit to receive a downstream data and video channel from the optical detection unit;
   a charging unit charged with the power supplied from the power supply unit in a steady state, the charging unit outputting charged power at the time of a power failure;
   a low speed driving unit supplied with power from the charging unit by driving the laser diode at a low power to establish a voice channel for the purpose of transmitting voice signal to the central office through the optical wavelength division multiplexer; and
   a low speed reception unit supplied with the power from the charging unit to receive a voice channel from the optical detection unit.

2. The optical network terminator according to claim 1, wherein the laser diode comprises a fabry-perot laser diode.

3. The optical network terminator according to claim 2, wherein the optical fiber comprises a strand of optical fiber adapted to connect the optical wavelength division multiplexer with the central office.

4. The optical network terminator according to claim 2, wherein the optical fiber comprises two strands of optical fiber, a first strand of the two strands directly supplying incoherent light to an optical network and transferring a downstream optical signal, a second strand of the two strands transferring an upstream optical signal, the two strands of the optical fiber adapted to connect the optical wavelength division multiplexer with the central office through a specific optical circulator.

5. The optical network terminator according to claim 2, wherein the laser diode is anti-reflection coated.

6. The optical network terminator according to claim 1, wherein the optical fiber comprises a strand of optical fiber adapted to connect the optical wavelength division multiplexer with the central office.

7. The optical network terminator according to claim 1, wherein the optical fiber comprises two strands of optical fiber, a first strand of the two strands directly supplying incoherent light to an optical network and transferring a downstream optical signal, a second strand of the two strands transferring an upstream optical signal, the two strands of the optical fiber adapted to connect the optical wavelength division multiplexer with the central office through a specific optical circulator.

8. The optical network terminator according to claim 1, wherein the laser diode is anti-reflection coated.

9. The optical network terminator according to claim 1, wherein the low speed driving unit drives the laser diode in a reverse bias.

10. The optical network terminator according to claim 1, wherein the low speed driving unit drives the laser diode in a forward bias below a threshold current.

11. An optical network terminator, the optical network terminator equipped with a power supply unit and adapted to be connected to a central office through an optical fiber, comprising:
    a beam splitter for receiving a reception optical signal and incoherent light provided from the central office, and individually outputting the reception optical signal and the incoherent light;
    an optical detection unit for converting a downstream high speed optical signal and downstream low speed optical signal corresponding to the reception optical signal provided from the beam splitter into electrical signals;
    a laser diode connected to the beam splitter to convert an upstream signal into an optical signal;
    a high speed driving unit supplied with power from the power supply unit to drive the laser diode that is forward biased using the upstream signal, establish a data and video channel, and transmit the data and video channel to the central office through the beam splitter;
    a high speed reception unit supplied with power from the power supply unit to receive a downstream data and video channel from the optical detection unit;
    a charging unit charged with the power supplied from the power supply unit in a steady state, the charging unit outputting charged power at the time of a power failure;
    a low speed driving unit supplied with power from the charging unit by driving the laser diode at a low power to establish a voice channel and transmit the voice channel to the optical wavelength division multiplexer through the beam splitter; and
    a low speed reception unit supplied with the power from the charging unit to receive a voice channel from the optical detection unit.

12. The optical network terminator according to claim 11, wherein the laser diode comprises a fabry-perot laser diode.

13. The optical network terminator according to claim 12, wherein the optical fiber comprises a strand of optical fiber to connect the beam splitter with the central office.

14. The optical network terminator according to claim 12, wherein the optical fiber comprises two strands of optical fiber, a first strand of the two strands directly supplying incoherent light to an optical network and transferring a downstream optical signal, a second strand of the two strands transferring an upstream optical signal, the two strands of optical fiber adapted to connect the beam splitter with the central office through a specific optical circulator.

15. The optical network terminator according to claim 12, wherein the laser diode is anti-reflection coated.

16. The optical network terminator according to claim 11, wherein the optical fiber comprises a strand of optical fiber to connect the beam splitter with the central office.

17. The optical network terminator according to claim 11, wherein the optical fiber comprises two strands of optical fiber, a first strand of the two strands directly supplying incoherent light to an optical network and transferring a downstream optical signal, a second strand of the two strands transferring an upstream optical signal, the two strands of optical fiber adapted to connect the beam splitter with the central office through a specific optical circulator.

18. The optical network terminator according to claim 11, wherein the laser diode is anti-reflection coated.

19. The optical network terminator according to claim 11, wherein the low speed driving unit drives the laser diode in a reverse bias.

20. The optical network terminator according to claim 11, wherein the low speed driving unit drives the laser diode in a forward bias below a threshold current.

* * * * *